(12) United States Patent
Yamazaki et al.

(10) Patent No.: US 11,262,549 B2
(45) Date of Patent: Mar. 1, 2022

(54) CAMERA OPTICAL LENS INCLUDING SEVEN LENSES OF ++-+---, ++---++- OR ++---+-- REFRACTIVE POWERS

(71) Applicant: AAC Optics Solutions Pte. Ltd., Singapore (SG)

(72) Inventors: Kaoru Yamazaki, Shenzhen (CN); Lei Zhang, Shenzhen (CN)

(73) Assignee: AAC Optics Solutions Pte. Ltd., Singapore (SG)

( * ) Notice: Subject to any disclaimer, the term of this patent is extended or adjusted under 35 U.S.C. 154(b) by 167 days.

(21) Appl. No.: 16/677,677

(22) Filed: Nov. 8, 2019

(65) Prior Publication Data
US 2020/0409087 A1 Dec. 31, 2020

(30) Foreign Application Priority Data
Jun. 29, 2019 (CN) .......................... 201910581352.3

(51) Int. Cl.
*G02B 13/00* (2006.01)
*G02B 9/64* (2006.01)

(52) U.S. Cl.
CPC ........... *G02B 13/0045* (2013.01); *G02B 9/64* (2013.01)

(58) Field of Classification Search
CPC ............................. G02B 13/0045; G02B 9/64
See application file for complete search history.

(56) References Cited

FOREIGN PATENT DOCUMENTS

| CN | 107918195 A | * | 4/2018 | |
|----|----|----|----|----|
| JP | 57038408 A | * | 3/1982 | .............. G02B 9/60 |
| JP | 02027310 A | * | 1/1990 | |
| JP | 2013145337 A | * | 7/2013 | |

OTHER PUBLICATIONS

JP-02027310-A, translation (1990).*
JP-57038408-A, translation (1982).*

* cited by examiner

*Primary Examiner* — Wen Huang
(74) *Attorney, Agent, or Firm* — W&G Law Group

(57) ABSTRACT

The present disclosure relates to the technical field of optical lens and discloses a camera optical lens. The camera optical lens includes, from an object side to an image side: a first lens, a second lens, a third lens, a fourth lens, a fifth lens, a sixth lens and a seventh lens. The camera optical lens satisfies following conditions: $1.51 \leq f1/f \leq 2.50$, $1.70 \leq n3 \leq 2.20$, $-2.00 \leq f3/f4 \leq 2.00$, $-10.00 \leq (R13+R14)/(R13-R14) \leq 10.00$ and $1.70 \leq n6 \leq 2.20$, where f denotes a focal length of the camera optical lens; f1 denotes a focal length of the first lens; f3 denotes a focal length of the third lens; f4 denotes a focal length of the fourth lens; n3 denotes a refractive index of the third lens; n7 denotes a refractive index of the seventh lens; R13 denotes a curvature radius of an object-side surface of the seventh lens; and R14 denotes a curvature radius of an image-side surface of the seventh lens.

20 Claims, 7 Drawing Sheets

US 11,262,549 B2

CAMERA OPTICAL LENS INCLUDING SEVEN LENSES OF ++−+−−−, ++−−++− OR ++−−+−− REFRACTIVE POWERS

TECHNICAL FIELD

The present disclosure relates to the field of optical lens, in particular, to a camera optical lens suitable for handheld devices, such as smart phones and digital cameras, and imaging devices, such as monitors or PC lenses.

BACKGROUND

With the emergence of smart phones in recent years, the demand for miniature camera lens is increasing day by day, but in general the photosensitive devices of camera lens are nothing more than Charge Coupled Device (CCD) or Complementary Metal-Oxide Semiconductor Sensor (CMOS sensor), and as the progress of the semiconductor manufacturing technology makes the pixel size of the photosensitive devices become smaller, plus the current development trend of electronic products towards better functions and thinner and smaller dimensions, miniature camera lens with good imaging quality therefore have become a mainstream in the market. In order to obtain better imaging quality, the lens that is traditionally equipped in mobile phone cameras adopts a three-piece or four-piece lens structure. Also, with the development of technology and the increase of the diverse demands of users, and as the pixel area of photosensitive devices is becoming smaller and smaller and the requirement of the system on the imaging quality is improving constantly, the five-piece, six-piece and seven-piece lens structure gradually appear in lens designs. There is an urgent need for ultra-thin wide-angle camera lenses which with good optical characteristics and fully corrected aberration.

DETAILED DESCRIPTION OF EMBODIMENTS

To make the objects, technical solutions, and advantages of the present disclosure clearer, embodiments of the present disclosure are described in detail with reference to accompanying drawings in the following. A person of ordinary skill in the art can understand that, in the embodiments of the present disclosure, many technical details are provided to make readers better understand the present disclosure. However, even without these technical details and any changes and modifications based on the following embodiments, technical solutions required to be protected by the present disclosure can be implemented.

Embodiment 1

Figure 1:
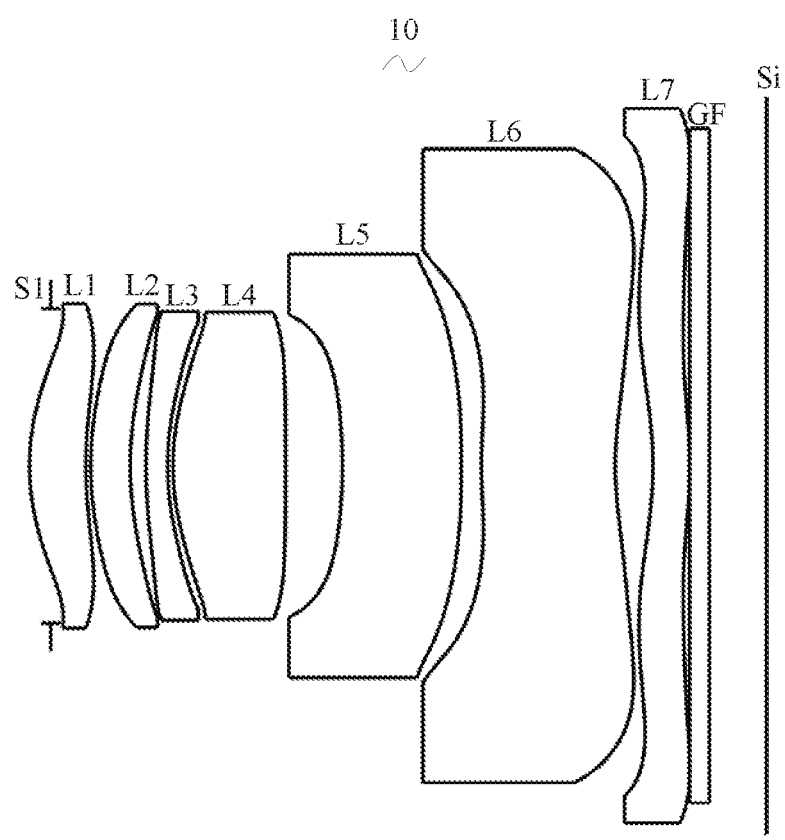
FIG. 1 is a schematic diagram of a structure of a camera optical lens according to Embodiment 1 of the present disclosure.

Referring to the accompanying drawings, the present disclosure provides a camera optical lens 10. FIG. 1 shows the camera optical lens 10 of Embodiment 1 of the present disclosure, the camera optical lens 10 includes seven lenses. Specifically, the camera optical lens 10 includes, from an object side to an image side: an aperture S1, a first lens L1, a second lens L2, a third lens L3, a fourth lens L4, a fifth lens L5, a sixth lens L6 and a seventh lens L7. An optical element such as an optical filter GF can be arranged between the seventh lens L7 and an image surface Si.

The first lens L1, the second lens L2, the fourth lens L4, the fifth lens L5 and the sixth lens L6 are all made of plastic material. The third lens L3 and the seventh lens L7 are both made of glass material.

Here, a focal length of the camera optical lens 10 is defined as f, a focal length of the first lens L1 is defined as f1, and the camera optical lens 10 should satisfy a condition of $1.51 \leq f1/f \leq 2.50$, which specifies a positive refractive power of the first lens L1. A value lower than a lower limit may facilitate a development towards ultra-thin lenses, but the positive refractive power of the first lens L1 may be too powerful to correct such a problem as aberration, which is unbeneficial for a development towards wide-angle lenses. On the contrary, a value higher than an upper limit may weaken the positive refractive power of the first lens L1, and it will be difficult to realize the development towards ultra-thin lenses. Preferably, the camera optical lens 10 further satisfies a condition of $1.52 \leq f1/f \leq 2.49$.

A refractive index of the third lens L3 is defined as n3, and the camera optical lens 10 should satisfy a condition of $1.70 \leq n3 \leq 2.20$, which specifies the refractive index of the third lens L3. Within this range, it facilitates the development towards ultra-thin lenses and correction of the aberration. Preferably, the camera optical lens 10 further satisfies a condition of $1.71 \leq n3 \leq 2.18$.

A focal length of the third lens L3 is defined as f3, a focal length of the fourth lens L4 is defined as f4, and the camera optical lens 10 should satisfy a condition of $-2.00 \leq f3/f4 \leq 2.00$, which specifies a ratio of the focal length f3 of the third lens L3 and the focal length f4 of the fourth lens L4. This can effectively reduce a sensitivity of the camera optical lens and further enhance an imaging quality. Preferably, the camera optical lens 10 further satisfies a condition of $-1.99 \leq f3/f4 \leq 1.99$.

A curvature radius of an object-side surface of the seventh lens L7 is defined as R13, a curvature radius of an image-side surface of the seventh lens L7 is defined as R14, and the camera optical lens 10 further satisfies a condition of $-10.00 \leq (R13+R14)/(R13-R14) \leq 10.00$, which specifies a shape of the seventh lens L7. Within this range, a development towards ultra-thin and wide-angle lens would facilitate correcting a problem like an off-axis aberration. Preferably, the camera optical lens 10 further satisfies a condition of $-9.99 \leq (R13+R14)/(R13-R14) \leq 9.99$.

A refractive index of the seventh lens L7 is defined as n7, and the camera optical lens 10 should satisfy a condition of $1.70 \leq n7 \leq 2.20$, which specifies the refractive index of the sixth lens L6. Within this range, it facilitates the development towards ultra-thin lenses and the correction of the aberration. Preferably, the camera optical lens 10 further satisfies a condition of $1.71 \leq n7 \leq 2.18$.

A total optical length from an object-side surface of the first lens L1 to the image surface Si of the camera optical lens along an optical axis is defined as TTL.

When a focal length f of the camera optical lens 10, the focal length f1 of the first lens L1, the focal length f3 of the third lens L3, the focal length f4 of the fourth lens L4, the refractive index n3 of the third lens L3, the refractive index n7 of the seventh lens L7, the curvature radius R13 of the object-side surface of the seventh lens L7, and the curvature radius R14 of the image-side surface of the seventh lens L7 all satisfy the above conditions, the camera optical lens 10 has an advantage of high performance and satisfies a design requirement of low TTL.

In an embodiment, the object-side surface of the first lens L1 is convex in a paraxial region, an image-side surface of the first lens L1 is concave in the paraxial region, and the first lens L1 has a positive refractive power.

A curvature radius of the object-side surface of the first lens L1 is defined as R1, a curvature radius of the image-side surface of the first lens L1 is defined as R2, and the camera optical lens 10 further satisfies a condition of $-11.83 \leq (R1+R2)/(R1-R2) \leq -2.18$. This can reasonably control a shape of the first lens L1 in such a manner that the first lens L1 can effectively correct a spherical aberration of the camera optical lens. Preferably, the camera optical lens 10 further satisfies a condition of $-7.39 \leq (R1+R2)/(R1-R2) \leq -2.37$.

An on-axis thickness of the first lens L1 is defined as d1, and the camera optical lens 10 further satisfies a condition of $0.03 \leq d1/TTL \leq 0.11$. This can facilitate achieving ultra-thin lenses. Preferably, the camera optical lens 10 further satisfies a condition of $0.04 \leq d1/TTL \leq 0.09$.

In an embodiment, an image-side surface of the second lens L2 is convex in the paraxial region, and the second lens L2 has a positive refractive power.

The focal length of the camera optical lens 10 is defined as f, the focal length of the second lens L2 is defined as f2, and the camera optical lens 10 further satisfies a condition of $0.35 \leq f2/f \leq 11.24$. By controlling a positive refractive power of the second lens L2 within a reasonable range, correction of the aberration of the optical system can be facilitated. Preferably, the camera optical lens 10 further satisfies a condition of $0.56 \leq f2/f \leq 8.99$.

A curvature radius of an object-side surface of the second lens L2 is defined as R3, a curvature radius of the image-side surface of the second lens L2 is defined as R4, and the camera optical lens 10 further satisfies a condition of $-40.21 \leq (R3+R4)/(R3-R4) \leq -0.06$, which specifies a shape of the second lens L2. Within this range, a development towards ultra-thin and wide-angle lenses would facilitate correcting the problem of an on-axis aberration. Preferably, the camera optical lens 10 further satisfies a condition of $-25.13 \leq (R3+R4)/(R3-R4) \leq -0.08$.

An on-axis thickness of the second lens L2 is defines as d3, and the camera optical lens 10 further satisfies a condition of $0.03 \leq d3/TTL \leq 0.16$. This can facilitate achieving ultra-thin lenses. Preferably, the camera optical lens 10 further satisfies a condition of $0.04 \leq d3/TTL \leq 0.13$.

In an embodiment, an image-side surface of the third lens L3 is concave, and the third lens L3 has a negative refractive power.

A focal length of the third lens L3 is defined as f3, and the camera optical lens 10 further satisfies a condition of $-6.06 \leq f3/f \leq -0.43$. An appropriate distribution of the refractive power leads to a better imaging quality and a lower sensitivity. Preferably, the camera optical lens 10 further satisfies a condition of $-3.79 \leq f3/f \leq -0.54$.

A curvature radius of an object-side surface of the third lens L3 is defined as R5, a curvature radius of the image-side surface of the third lens L3 is defined as R6, and the camera optical lens 10 further satisfies a condition of $-0.18 \leq (R5+R6)/(R5-R6) \leq 13.44$. This can effectively control a shape of the third lens L3, thereby facilitating shaping of the third lens and avoiding bad shaping and generation of stress due to an the overly large surface curvature of the third lens L3. Preferably, the camera optical lens 10 further satisfies a condition of $-0.11 \leq (R5+R6)/(R5-R6) \leq 10.75$.

An on-axis thickness of the third lens L3 is defined as d5, and the camera optical lens 10 further satisfies a condition of $0.01 \leq d5/TTL \leq 0.08$. This can facilitate achieving ultra-thin lenses. Preferably, the camera optical lens 10 further satisfies a condition of $0.02 \leq d5/TTL \leq 0.06$.

In an embodiment, the fourth lens L4 has a refractive power.

A focal length of the fourth lens L4 is defined as f4, and the camera optical lens 10 further satisfies a condition of $-157.76 \leq f4/f \leq 1.19$. The appropriate distribution of refractive power makes it possible that the system has the better imaging quality and the lower sensitivity. Preferably, the camera optical lens 10 further satisfies a condition of $-98.60 \leq f4/f \leq 0.95$.

A curvature radius of an object-side surface of the fourth lens L4 is defined as R7, a curvature radius of an image-side surface of the fourth lens L4 is defined as R8, and the camera optical lens 10 further satisfies a condition of $-1.86 \leq (R7+R8)/(R7-R8) \leq 47.99$, which specifies a shape of the fourth lens L4. Within this range, a development towards ultra-thin and wide-angle lens would facilitate correcting a problem like an off-axis aberration. Preferably, the camera optical lens 10 further satisfies a condition of $-1.16 \leq (R7+R8)/(R7-R8) \leq 38.40$.

An on-axis thickness of the fourth lens L4 is defined as d7, and the camera optical lens 10 further satisfies a condition of $0.03 \leq d7/TTL \leq 0.23$. This can facilitate achieving ultra-thin lenses. Preferably, the camera optical lens 10 further satisfies a condition of $0.04 \leq d7/TTL \leq 0.18$.

In an embodiment, an image-side surface of the fifth lens L5 is convex, and the fifth lens L5 has a refractive power.

A focal length of the fifth lens L5 is defined as f5, and the camera optical lens 10 further satisfies a condition of $-3.98 \leq f5/f \leq 5.44$, which can effectively make a light angle of the camera lens gentle and reduce an tolerance sensitivity. Preferably, the camera optical lens 10 further satisfies a condition of $-2.48 \leq f5/f \leq 4.35$.

A curvature radius of an object-side surface of the fifth lens L5 is defined as R9, a curvature radius of the image-side surface of the fifth lens L5 is defined as R10, and the camera optical lens 10 further satisfies a condition of $-3.31 \leq (R9+R10)/(R9-R10) \leq 1.28$, which specifies a shape of the fifth lens L5. Within this range, a development towards ultra-thin and wide-angle lenses can facilitate correcting a problem of the off-axis aberration. Preferably, the camera optical lens 10 further satisfies a condition of $-2.07 \leq (R9+R10)/(R9-R10) \leq 1.02$.

An on-axis thickness of the fifth lens L5 is defined as d9, and the camera optical lens 10 further satisfies a condition of 0.06≤d9/TTL≤0.24. This can facilitate achieving ultra-thin lenses. Preferably, the camera optical lens 10 further satisfies a condition of 0.10≤d9/TTL≤0.19.

In an embodiment, an image-side surface of the sixth lens L6 is concave in the paraxial region and the sixth lens L6 has a refractive power.

A focal length of the sixth lens L6 is defined as f6, and the camera optical lens 10 further satisfies a condition of −8.40≤f6/f≤1.59. The appropriate distribution of refractive power makes it possible that the system has the better imaging quality and lower sensitivity. Preferably, the camera optical lens 10 further satisfies a condition of −5.25≤f6/f≤1.27.

A curvature radius of an object-side surface of the sixth lens L6 is defined as R11, a curvature radius of the image-side surface of the sixth lens L6 is defined as R12, and the camera optical lens 10 further satisfies a condition of −5.91≤ (R11+R12)/(R11−R12)≤7.63, which specifies a shape of the sixth lens L6. Within this range, a development towards ultra-thin and wide-angle lenses would facilitate correcting the problem of the off-axis aberration. Preferably, the camera optical lens 10 further satisfies a condition of −3.69≤ (R11+R12)/(R11−R12)≤6.10.

An on-axis thickness of the sixth lens L6 is defined as d11, and the camera optical lens 10 further satisfies a condition of 0.04≤d11/TTL≤0.27. This can facilitate achieving ultra-thin lenses. Preferably, the camera optical lens 10 further satisfies a condition of 0.06≤d11/TTL≤0.22.

In an embodiment, the seventh lens L7 has a negative refractive power.

A focal length of the seventh lens L7 is defined as f7, and the camera optical lens 10 further satisfies a condition of −11.96≤f7/f≤−0.38. The appropriate distribution of refractive power makes it possible that the system has the better imaging quality and lower sensitivity. Preferably, the camera optical lens 10 further satisfies a condition of −7.47≤f7/f≤−0.47.

An on-axis thickness of the seventh lens L7 is defined as d13, and the camera optical lens 10 further satisfies a condition of 0.02≤d13/TTL≤0.14. This can facilitate achieving ultra-thin lenses. Preferably, the camera optical lens 10 further satisfies a condition of 0.04≤d13/TTL≤0.11.

In an embodiment, the total optical length TTL of the camera optical lens 10 is less than or equal to 8.62 mm, which is beneficial for achieving ultra-thin lenses. Preferably, the total optical length TTL of the camera optical lens 10 is less than or equal to 8.23 mm.

In an embodiment, an F number of the camera optical lens 10 is less than or equal to 1.96. The camera optical lens has a large aperture and a better imaging performance. Preferably, the F number of the camera optical lens 10 is less than or equal to 1.92.

With such designs, the total optical length TTL of the camera optical lens 10 can be made as short as possible, thus the miniaturization characteristics can be maintained.

In the following, examples will be used to describe the camera optical lens 10 of the present disclosure. The symbols recorded in each example will be described as follows. The focal length, on-axis distance, curvature radius, on-axis thickness, inflexion point position, and arrest point position are all in units of mm.

TTL: Optical length (the total optical length from the object-side surface of the first lens to the image surface of the camera optical lens along the optical axis) in mm.

Preferably, inflexion points and/or arrest points can be arranged on the object-side surface and/or the image-side surface of the lens, so as to satisfy the demand for high quality imaging. The description below can be referred for specific implementations.

The design data of the camera optical lens 10 in Embodiment 1 of the present disclosure are shown in Table 1 and Table 2.

TABLE 1

|  | R | d |  | nd |  | vd |
|---|---|---|---|---|---|---|
| S1 | ∞ | d0= | −0.226 |  |  |  |
| R1 | 2.665 | d1= | 0.600 | nd1 | 1.5439 | v1 | 55.95 |
| R2 | 4.796 | d2= | 0.050 |  |  |  |
| R3 | 3.537 | d3= | 0.422 | nd2 | 1.5439 | v2 | 55.95 |
| R4 | 3.908 | d4= | 0.168 |  |  |  |
| R5 | 6.984 | d5= | 0.230 | nd3 | 1.7174 | v3 | 29.50 |
| R6 | 3.542 | d6= | 0.057 |  |  |  |
| R7 | 2.911 | d7= | 1.196 | nd4 | 1.5439 | v4 | 55.95 |
| R8 | −82.120 | d8= | 0.605 |  |  |  |
| R9 | −6.391 | d9= | 1.266 | nd5 | 1.6713 | v5 | 19.24 |
| R10 | −25.927 | d10= | 0.214 |  |  |  |
| R11 | 5.403 | d11= | 1.423 | nd6 | 1.5672 | v6 | 37.49 |
| R12 | 3.627 | d12= | 0.401 |  |  |  |
| R13 | −4.213 | d13= | 0.390 | nd7 | 1.7174 | v7 | 29.50 |
| R14 | −5.152 | d14= | 0.001 |  |  |  |
| R15 | ∞ | d15= | 0.210 | ndg | 1.5168 | vg | 64.20 |
| R16 | ∞ | d16= | 0.610 |  |  |  |

In the table, meanings of various symbols will be described as follows.

S1: aperture;

R: curvature radius of an optical surface, a central curvature radius for a lens;

R1: curvature radius of the object-side surface of the first lens L1;

R2: curvature radius of the image-side surface of the first lens L1;

R3: curvature radius of the object-side surface of the second lens L2;

R4: curvature radius of the image-side surface of the second lens L2;

R5: curvature radius of the object-side surface of the third lens L3;

R6: curvature radius of the image-side surface of the third lens L3;

R7: curvature radius of the object-side surface of the fourth lens L4;

R8: curvature radius of the image-side surface of the fourth lens L4;

R9: curvature radius of the object-side surface of the fifth lens L5;

R10: curvature radius of the image-side surface of the fifth lens L5;

R11: curvature radius of the object-side surface of the sixth lens L6;

R12: curvature radius of the image-side surface of the sixth lens L6;

R13: curvature radius of the object-side surface of the seventh lens L7;

R14: curvature radius of the image-side surface of the seventh lens L7;

R15: curvature radius of an object-side surface of the optical filter GF;

R16: curvature radius of an image-side surface of the optical filter GF;

d: on-axis thickness of a lens and an on-axis distance between lens;

d0: on-axis distance from the aperture S1 to the object-side surface of the first lens L1;

d1: on-axis thickness of the first lens L1;

d2: on-axis distance from the image-side surface of the first lens L1 to the object-side surface of the second lens L2;

d3: on-axis thickness of the second lens L2;

d4: on-axis distance from the image-side surface of the second lens L2 to the object-side surface of the third lens L3;

d5: on-axis thickness of the third lens L3;

d6: on-axis distance from the image-side surface of the third lens L3 to the object-side surface of the fourth lens L4;

d7: on-axis thickness of the fourth lens L4;

d8: on-axis distance from the image-side surface of the fourth lens L4 to the object-side surface of the fifth lens L5;

d9: on-axis thickness of the fifth lens L5;

d10: on-axis distance from the image-side surface of the fifth lens L5 to the object-side surface of the sixth lens L6;

d11: on-axis thickness of the sixth lens L6;

d12: on-axis distance from the image-side surface of the sixth lens L6 to the object-side surface of the seventh lens L7;

d13: on-axis thickness of the seventh lens L7;

d14: on-axis distance from the image-side surface of the seventh lens L7 to the object-side surface of the optical filter GF;

d15: on-axis thickness of the optical filter GF;

d16: on-axis distance from the image-side surface to the image surface of the optical filter GF;

nd: refractive index of the d line;

nd1: refractive index of the d line of the first lens L1;

nd2: refractive index of the d line of the second lens L2;

nd3: refractive index of the d line of the third lens L3;

nd4: refractive index of the d line of the fourth lens L4;

nd5: refractive index of the d line of the fifth lens L5;

nd6: refractive index of the d line of the sixth lens L6;

nd7: refractive index of the d line of the seventh lens L7;

ndg: refractive index of the d line of the optical filter GF;

vd: abbe number;

v1: abbe number of the first lens L1;

v2: abbe number of the second lens L2;

v3: abbe number of the third lens L3;

v4: abbe number of the fourth lens L4;

v5: abbe number of the fifth lens L5;

v6: abbe number of the sixth lens L6;

v7: abbe number of the seventh lens L7;

vg: abbe number of the optical filter GF.

Table 2 shows aspherical surface data of the camera optical lens 10 in Embodiment 1 of the present disclosure.

TABLE 2

| | Conic coefficient | Aspheric surface coefficients | | | | | | |
|---|---|---|---|---|---|---|---|---|
| | k | A4 | A6 | A8 | A10 | A12 | A14 | A16 |
| R1  | 0.0000E+00  | −7.5341E−03 | −3.1824E−03 | −1.0261E−03 | −6.0454E−04 | −6.5015E−06 | 7.1729E−05  | −7.7729E−06 |
| R2  | 0.0000E+00  | −2.9810E−02 | −4.3172E−03 | 1.1700E−03  | −5.0598E−04 | 5.8399E−04  | −2.5198E−04 | 3.4796E−05  |
| R3  | 0.0000E+00  | −2.5032E−02 | 2.1390E−04  | 2.9762E−03  | 1.2607E−03  | −4.4521E−04 | −4.7178E−05 | 1.6376E−05  |
| R4  | 0.0000E+00  | −9.8894E−03 | −4.1401E−03 | 7.0855E−04  | 2.1640E−04  | −1.3790E−05 | 2.9117E−05  | −7.1371E−06 |
| R5  | 0.0000E+00  | 2.4423E−02  | −4.7777E−02 | 2.8130E−02  | −1.0553E−02 | 2.8689E−03  | −4.2222E−04 | 2.2706E−05  |
| R6  | 0.0000E+00  | 5.6659E−02  | −1.2776E−01 | 1.0810E−01  | −5.3177E−02 | 1.5890E−02  | −2.4524E−03 | 1.2276E−04  |
| R7  | 0.0000E+00  | 2.7410E−02  | −8.8360E−02 | 7.1448E−02  | −3.0069E−02 | 5.4833E−03  | 2.5674E−04  | −1.7692E−04 |
| R8  | 0.0000E+00  | −3.5700E−04 | −8.7912E−03 | 9.4256E−03  | −9.4415E−03 | 4.6633E−03  | −1.1054E−03 | 9.8553E−05  |
| R9  | 0.0000E+00  | −1.5652E−02 | 8.5666E−03  | −2.0165E−02 | 1.6687E−02  | −9.6055E−03 | 2.9639E−03  | −3.8486E−04 |
| R10 | 0.0000E+00  | −7.5697E−02 | 5.9698E−02  | −2.8051E−02 | 7.8146E−03  | −1.3249E−03 | 1.2621E−04  | −5.0309E−06 |
| R11 | −2.2305E+00 | −1.3827E−01 | 7.7459E−02  | −3.1357E−02 | 8.1657E−03  | −1.3520E−03 | 1.2770E−04  | −5.0369E−06 |
| R12 | 0.0000E+00  | −7.8373E−02 | 2.9939E−02  | −7.1956E−03 | 1.0456E−03  | −9.2900E−05 | 4.6070E−06  | −9.7882E−08 |
| R13 | 0.0000E+00  | 2.9653E−02  | 5.2009E−05  | −1.0053E−03 | 2.0170E−04  | −1.9348E−05 | 9.4129E−07  | −1.8683E−08 |
| R14 | 0.0000E+00  | 5.2873E−02  | −1.3816E−02 | 2.1317E−03  | −1.9370E−04 | 1.0266E−05  | −2.9605E−07 | 3.5967E−09  |

Here, K is a conic coefficient, and A4, A6, A8, A10, A12, A14, and A16 are aspheric surface coefficients.

IH: Image height $$y=(x^2/R)/[1+\{1-(k+1)(x^2/R^2)\}^{1/2}]+A4x^4+A6x^6+A8x^8+A10x^{10}+A12x^{12}+A14x^{14}+A16x^{16} \quad (1)$$

For convenience, an aspheric surface of each lens surface uses the aspheric surfaces shown in the above formula (1). However, the present disclosure is not limited to the aspherical polynomials form shown in the formula (1).

Table 3 and Table 4 show design data of inflexion points and arrest points of the camera optical lens 10 according to Embodiment 1 of the present disclosure. P1R1 and P1R2 represent the object-side surface and the image-side surface of the first lens L1, P2R1 and P2R2 represent the object-side surface and the image-side surface of the second lens L2, P3R1 and P3R2 represent the object-side surface and the image-side surface of the third lens L3, P4R1 and P4R2 represent the object-side surface and the image-side surface of the fourth lens L4, P5R1 and P5R2 represent the object-side surface and the image-side surface of the fifth lens L5, P6R1 and P6R2 represent the object-side surface and the image-side surface of the sixth lens L6, and P7R1 and P7R2 represent the object-side surface and the image-side surface of the seventh lens L7. The data in the column named "inflexion point position" refer to vertical distances from inflexion points arranged on each lens surface to the optic axis of the camera optical lens 10. The data in the column named "arrest point position" refer to vertical distances from arrest points arranged on each lens surface to the optical axis of the camera optical lens 10.

TABLE 3

| | Number(s) of inflexion points | Inflexion point position 1 | Inflexion point position 2 | Inflexion point position 3 |
|---|---|---|---|---|
| P1R1 | 1 | 1.145 | | |
| P1R2 | 2 | 0.735 | 1.765 | |
| P2R1 | 0 | | | |
| P2R2 | 0 | | | |
| P3R1 | 2 | 0.875 | 1.265 | |

TABLE 3-continued

|   | Number(s) of inflexion points | Inflexion point position 1 | Inflexion point position 2 | Inflexion point position 3 |
|---|---|---|---|---|
| P3R2 | 1 | 1.555 | | |
| P4R1 | 1 | 1.415 | | |
| P4R2 | 0 | | | |
| P5R1 | 0 | | | |
| P5R2 | 1 | 2.075 | | |
| P6R1 | 2 | 0.365 | 2.175 | |
| P6R2 | 3 | 0.715 | 1.385 | 1.695 |
| P7R1 | 2 | 0.875 | 2.445 | |
| P7R2 | 2 | 0.645 | 2.885 | |

TABLE 4

|   | Number(s) of arrest points | Arrest point position 1 | Arrest point position 2 |
|---|---|---|---|
| P1R1 | 1 | 1.675 | |
| P1R2 | 1 | 1.245 | |
| P2R1 | 0 | | |
| P2R2 | 0 | | |
| P3R1 | 0 | | |
| P3R2 | 0 | | |
| P4R1 | 0 | | |
| P4R2 | 0 | | |
| P5R1 | 0 | | |
| P5R2 | 0 | | |
| P6R1 | 1 | 0.695 | |
| P6R2 | 1 | 2.335 | |
| P7R1 | 2 | 1.755 | 2.925 |
| P7R2 | 2 | 1.435 | 3.315 |

Figure 2:
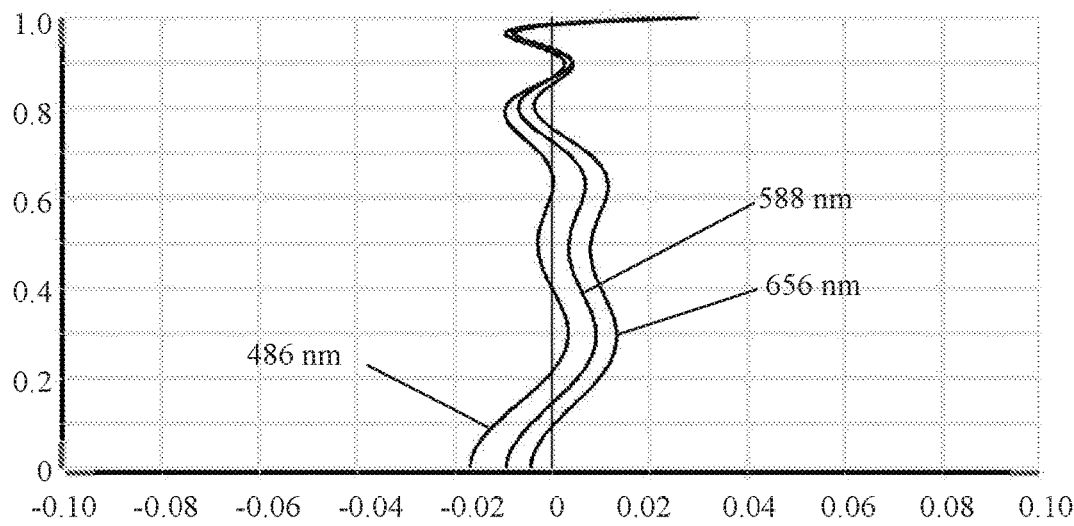
FIG. 2 is a schematic diagram of a longitudinal aberration of the camera optical lens shown in FIG. 1.
Figure 3:
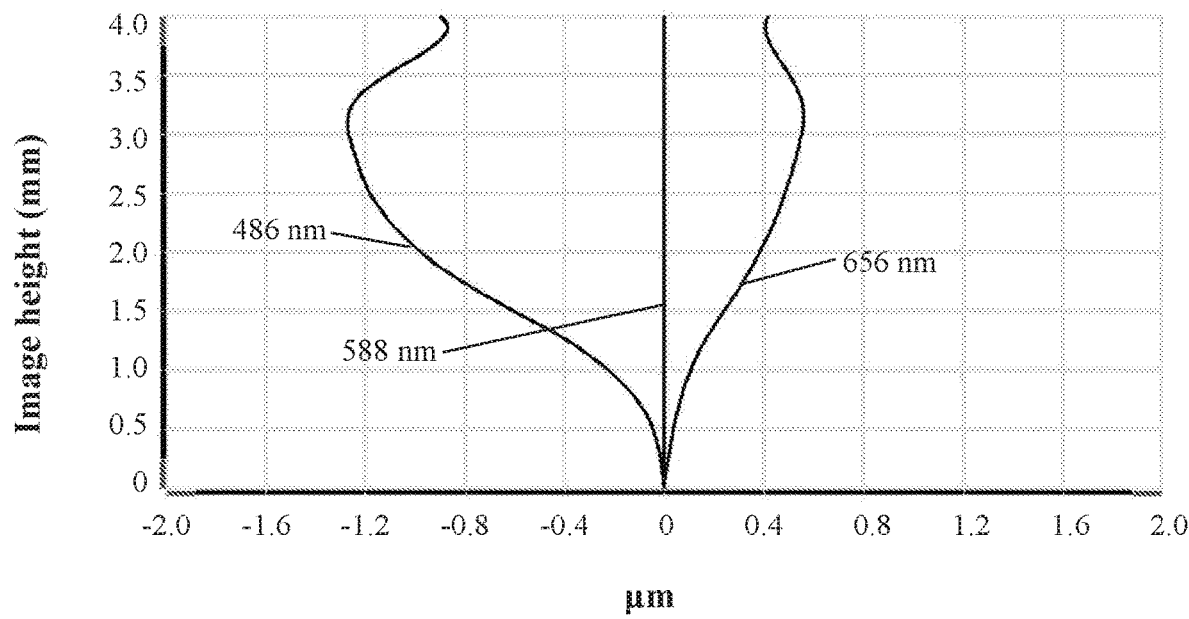
FIG. 3 is a schematic diagram of a lateral color of the camera optical lens shown in FIG. 1.
Figure 4:
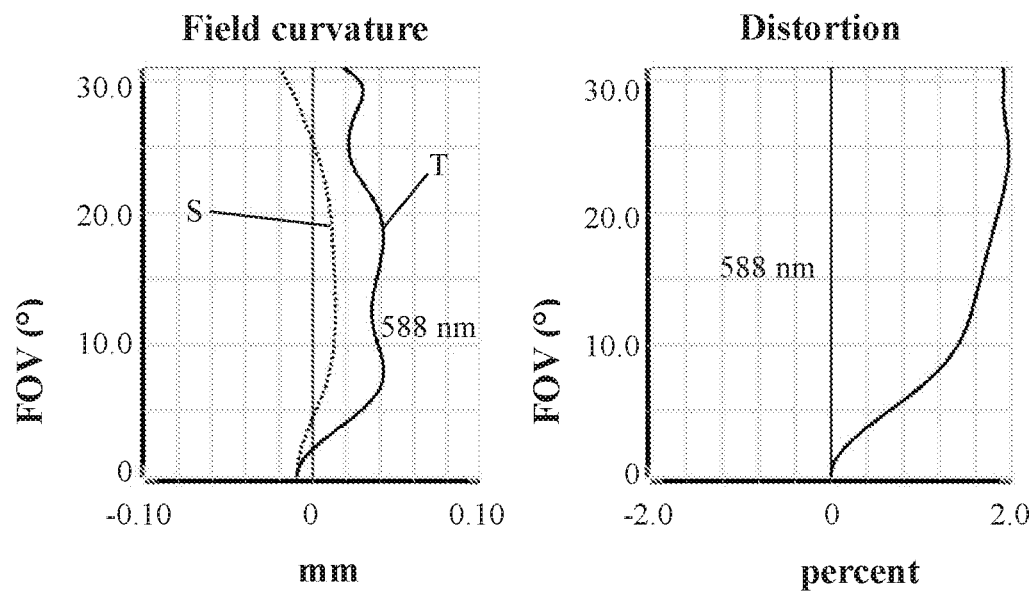
FIG. 4 is a schematic diagram of a field curvature and a distortion of the camera optical lens shown in FIG. 1.
Figure 5:
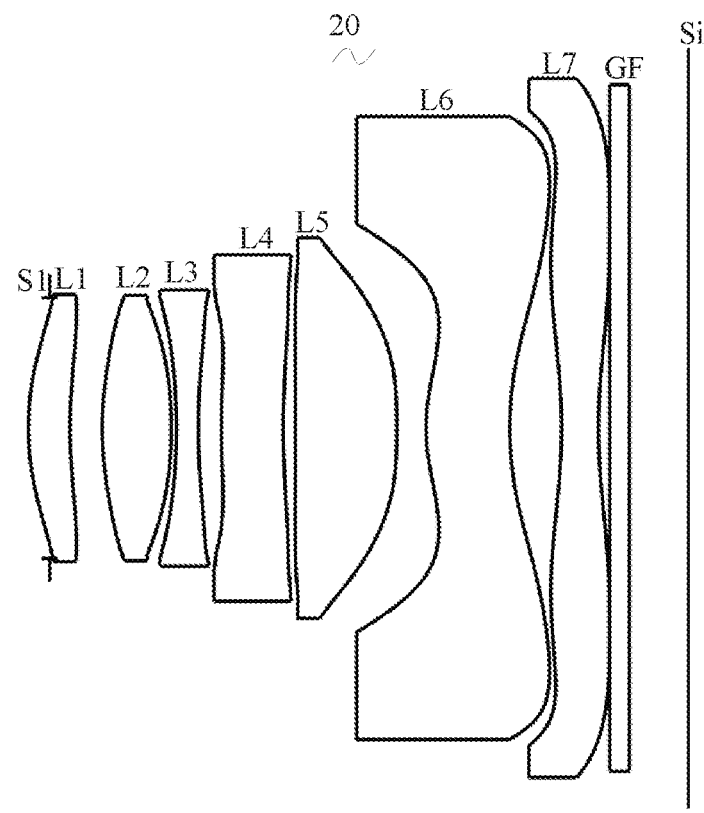
FIG. 5 is a schematic diagram of a structure of a camera optical lens according to Embodiment 2 of the present disclosure.

FIG. 2 and FIG. 3 illustrate a longitudinal aberration and a lateral color with wavelengths of 486 nm, 588 nm and 656 nm after passing the camera optical lens 10 according to Embodiment 1, respectively. FIG. 4 illustrates a field curvature and a distortion with a wavelength of 588 nm after passing the camera optical lens 10 according to Embodiment 1. A field curvature S in FIG. 4 is a field curvature in a sagittal direction, and T is a field curvature in a tangential direction.

Table 13 in the following shows various values of Embodiments 1, 2, 3 and values corresponding to parameters which are specified in the above conditions.

As shown in Table 13, Embodiment 1 satisfies the above conditions.

In this Embodiment, an entrance pupil diameter of the camera optical lens is 3.434 mm, an image height of 1.0 H is 4.00 mm, a FOV (field of view) in a diagonal direction is 61.95°. Thus, the camera optical lens has a wide-angle and is ultra-thin. Its on-axis and off-axis aberrations are fully corrected, thereby achieving excellent optical characteristics.

Embodiment 2

Embodiment 2 is basically the same as Embodiment 1 and involves symbols having the same meanings as Embodiment 1, and only differences therebetween will be described in the following.

Table 5 and Table 6 show design data of a camera optical lens 20 in Embodiment 2 of the present disclosure.

TABLE 5

|   | R | d | | nd | | vd |
|---|---|---|---|---|---|---|
| S1 | ∞ | d0= | −0.226 | | | |
| R1 | 2.849 | d1= | 0.441 | nd1 | 1.5439 | v1 | 55.95 |
| R2 | 5.353 | d2= | 0.340 | | | |
| R3 | 3.528 | d3= | 0.731 | nd2 | 1.5439 | v2 | 55.95 |
| R4 | −4.230 | d4= | 0.055 | | | |
| R5 | −6.017 | d5= | 0.230 | nd3 | 1.9515 | v3 | 29.83 |
| R6 | 7.197 | d6= | 0.245 | | | |
| R7 | 8.437 | d7= | 0.653 | nd4 | 1.6150 | v4 | 25.92 |
| R8 | 7.926 | d8= | 0.129 | | | |
| R9 | 147.167 | d9= | 1.071 | nd5 | 1.5672 | v5 | 37.49 |
| R10 | −11.610 | d10= | 0.309 | | | |
| R11 | 1.866 | d11= | 0.885 | nd6 | 1.5672 | v6 | 37.49 |
| R12 | 3.777 | d12= | 0.548 | | | |
| R13 | −5.753 | d13= | 0.390 | nd7 | 1.9515 | v7 | 29.83 |
| R14 | 5.743 | d14= | 0.118 | | | |
| R15 | ∞ | d15= | 0.210 | ndg | 1.5168 | vg | 64.20 |
| R16 | ∞ | d16= | 0.624 | | | |

Table 6 shows aspherical surface data of each lens of the camera optical lens 20 in Embodiment 2 of the present disclosure.

TABLE 6

|   | Conic coefficient | Aspheric surface coefficients | | | | | | |
|---|---|---|---|---|---|---|---|---|
|   | k | A4 | A6 | A8 | A10 | A12 | A14 | A16 |
| R1 | 0.0000E+00 | −1.3151E−02 | −5.0170E−03 | −7.4229E−04 | −6.3406E−04 | 1.9088E−04 | 1.2677E−04 | −7.7209E−05 |
| R2 | 0.0000E+00 | −3.1053E−02 | −2.1925E−03 | 1.0521E−03 | −3.2491E−04 | 4.4533E−04 | −7.8238E−05 | −4.6283E−05 |
| R3 | 0.0000E+00 | −2.6350E−02 | −2.4056E−03 | 3.1553E−03 | 1.7278E−03 | −4.9880E−04 | −9.8411E−05 | 3.7200E−05 |
| R4 | 0.0000E+00 | −1.2559E−02 | −4.4719E−03 | 2.0393E−03 | 6.6275E−04 | 2.3639E−05 | −2.8186E−05 | −1.3207E−05 |
| R5 | 0.0000E+00 | 1.0656E−02 | −2.5957E−02 | 3.4147E−02 | −4.1364E−02 | 2.8277E−02 | −8.8218E−03 | 9.6269E−04 |
| R6 | 0.0000E+00 | −8.1869E−03 | 6.5403E−03 | −3.1032E−02 | 3.9830E−02 | −3.1818E−02 | 1.4561E−02 | −2.5839E−03 |
| R7 | 0.0000E+00 | −6.4759E−02 | 5.2209E−02 | −1.0772E−01 | 1.2408E−01 | −8.5550E−02 | 3.2057E−02 | −4.7665E−03 |
| R8 | 0.0000E+00 | −3.9304E−02 | 4.1064E−02 | −4.1281E−02 | 2.2076E−02 | −5.8391E−03 | 7.2259E−04 | −3.2747E−05 |
| R9 | 0.0000E+00 | −3.8807E−02 | 7.3322E−02 | −6.5953E−02 | 3.3428E−02 | −9.6460E−03 | 1.5069E−03 | −1.0115E−04 |
| R10 | 0.0000E+00 | −2.0274E−01 | 1.7065E−01 | −1.0654E−01 | 4.5370E−02 | −1.2294E−02 | 1.8811E−03 | −1.2141E−04 |
| R11 | −8.3431E+00 | −6.2548E−02 | 3.0108E−03 | −6.2028E−04 | −1.3579E−03 | 5.9537E−04 | −7.7364E−05 | 2.7563E−06 |
| R12 | 0.0000E+00 | 1.7338E−02 | −2.4089E−02 | 8.1224E−03 | −1.5092E−03 | 1.6152E−04 | −9.2956E−06 | 2.1974E−07 |
| R13 | 0.0000E+00 | 2.3834E−02 | −4.8057E−03 | 1.6985E−03 | −4.1163E−04 | 5.2469E−05 | −3.3425E−06 | 8.3414E−08 |
| R14 | 0.0000E+00 | −2.5472E−02 | 2.9819E−03 | 1.2637E−05 | −4.4637E−05 | 4.8235E−06 | −2.2238E−07 | 3.9319E−09 |

Table 7 and table 8 show design data of inflexion points and arrest points of each lens of the camera optical lens 20 lens according to Embodiment 2 of the present disclosure.

TABLE 7

| | Number(s) of inflexion points | Inflexion point position 1 | Inflexion point position 2 | Inflexion point position 3 |
|---|---|---|---|---|
| P1R1 | 1 | 1.045 | | |
| P1R2 | 1 | 0.705 | | |
| P2R1 | 0 | | | |
| P2R2 | 0 | | | |
| P3R1 | 0 | | | |
| P3R2 | 3 | 0.825 | 1.115 | 1.415 |
| P4R1 | 3 | 0.435 | 1.255 | 1.455 |
| P4R2 | 3 | 0.755 | 1.275 | 1.665 |
| P5R1 | 3 | 0.135 | 0.635 | 1.695 |
| P5R2 | 2 | 1.765 | 1.965 | |
| P6R1 | 1 | 0.585 | | |
| P6R2 | 1 | 1.215 | | |
| P7R1 | 2 | 0.925 | 2.315 | |
| P7R2 | 1 | 0.875 | | |

TABLE 8

| | Number of arrest points | Arrest point position 1 | Arrest point position 2 |
|---|---|---|---|
| P1R1 | 0 | | |
| P1R2 | 1 | 1.235 | |
| P2R1 | 0 | | |
| P2R2 | 0 | | |
| P3R1 | 0 | | |
| P3R2 | 0 | | |
| P4R1 | 1 | 0.745 | |
| P4R2 | 0 | | |
| P5R1 | 2 | 0.225 | 0.945 |
| P5R2 | 0 | | |
| P6R1 | 1 | 1.085 | |
| P6R2 | 1 | 2.575 | |
| P7R1 | 2 | 1.735 | 2.725 |
| P7R2 | 1 | 2.145 | |

Figure 6:
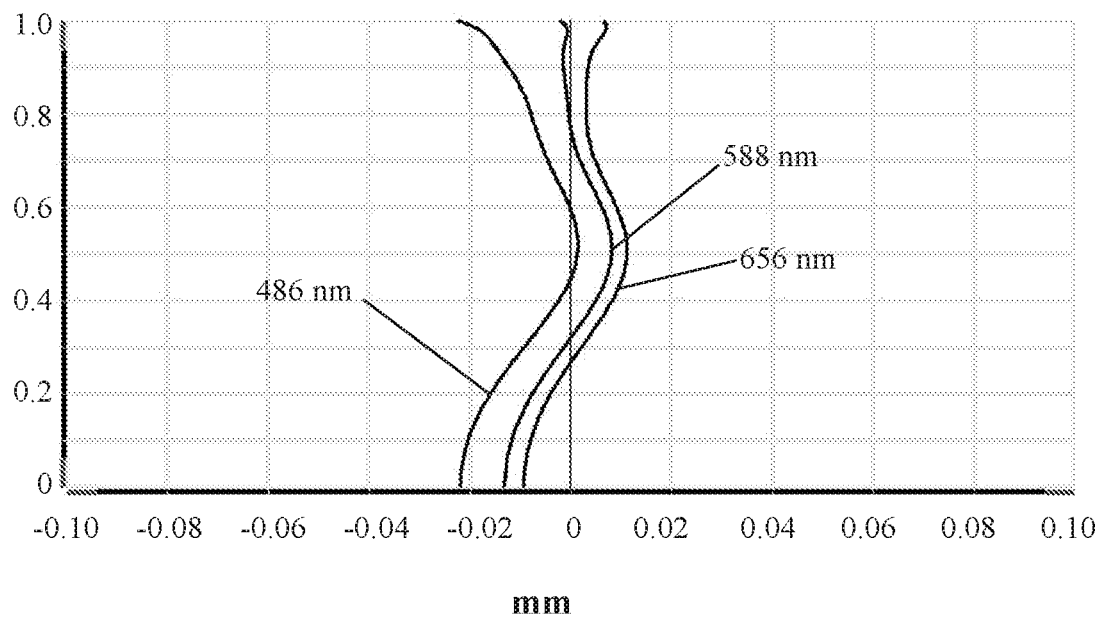
FIG. 6 is a schematic diagram of a longitudinal aberration of the camera optical lens shown in FIG. 5.
Figure 7:
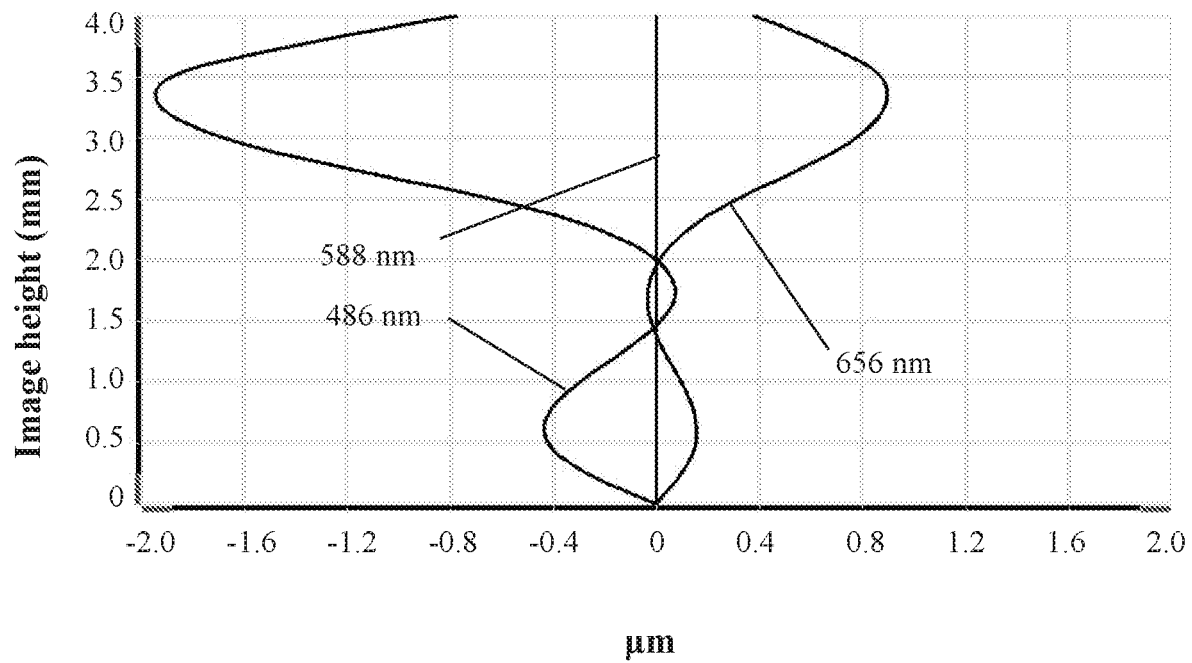
FIG. 7 is a schematic diagram of a lateral color of the camera optical lens shown in FIG. 5.
Figure 8:
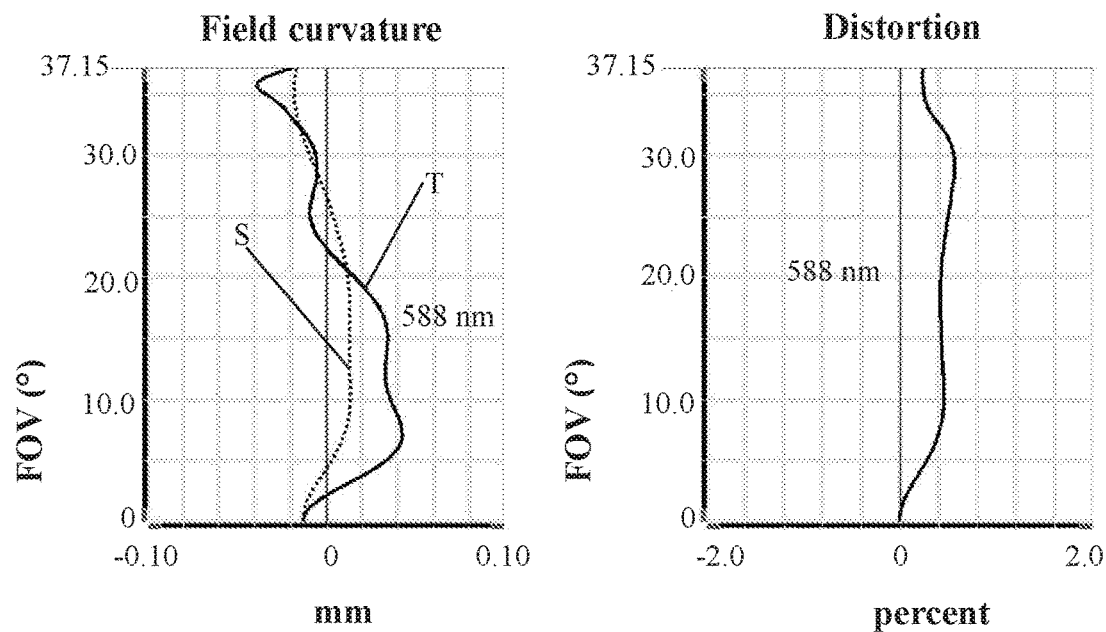
FIG. 8 is a schematic diagram of a field curvature and a distortion of the camera optical lens shown in FIG. 5.
Figure 9:
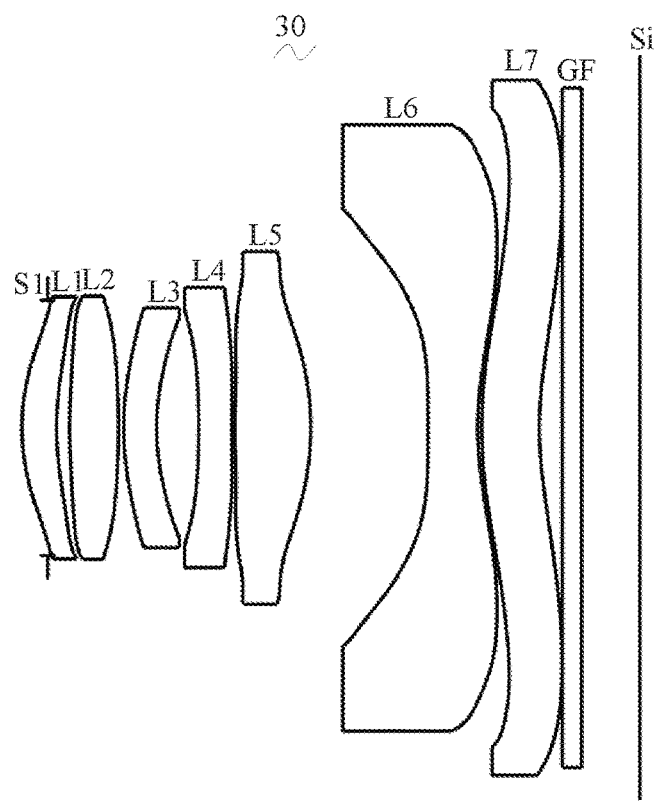
FIG. 9 is a schematic diagram of a structure of a camera optical lens according to Embodiment 3 of the present disclosure.

FIG. 6 and FIG. 7 illustrate a longitudinal aberration and a lateral color of light with wavelengths of 486 nm, 588 nm and 656 nm after passing the camera optical lens 20 according to Embodiment 2. FIG. 8 illustrates a field curvature and a distortion of light with a wavelength of 588 nm after passing the camera optical lens 20 according to Embodiment 2.

As shown in Table 13, Embodiment 2 satisfies the above conditions.

In an embodiment, an entrance pupil diameter of the camera optical lens is 2.760 mm, an image height of 1.0 H is 4.00 mm, a FOV (field of view) in the diagonal direction is 74.30°. Thus, the camera optical lens has a wide-angle and is ultra-thin. Its on-axis and off-axis aberrations are fully corrected, thereby achieving excellent optical characteristics.

Embodiment 3

Embodiment 3 is basically the same as Embodiment 1 and involves symbols having the same meanings as Embodiment 1, and only differences therebetween will be described in the following.

Table 9 and Table 10 show design data of a camera optical lens 30 in Embodiment 3 of the present disclosure.

TABLE 9

| | R | | d | nd | | vd |
|---|---|---|---|---|---|---|
| S1 | ∞ | d0= | −0.270 | | | |
| R1 | 2.340 | d1= | 0.368 | nd1 | 1.5439 v1 | 55.95 |
| R2 | 3.292 | d2= | 0.141 | | | |
| R3 | 7.671 | d3= | 0.528 | nd2 | 1.5439 v2 | 55.95 |
| R4 | −9.238 | d4= | 0.055 | | | |
| R5 | 3.284 | d5= | 0.355 | nd3 | 2.1540 v3 | 17.15 |
| R6 | 2.624 | d6= | 0.455 | | | |
| R7 | −10.859 | d7= | 0.359 | nd4 | 1.6397 v4 | 23.53 |
| R8 | 9.908 | d8= | 0.035 | | | |
| R9 | 7.529 | d9= | 0.817 | nd5 | 1.5439 v5 | 55.95 |
| R10 | −3.117 | d10= | 1.259 | | | |
| R11 | −286.892 | d11= | 0.536 | nd6 | 1.5672 v6 | 37.49 |
| R12 | 3.500 | d12= | 0.044 | | | |
| R13 | 4.696 | d13= | 0.623 | nd7 | 2.1540 v7 | 17.15 |
| R14 | 3.841 | d14= | 0.248 | | | |
| R15 | ∞ | d15= | 0.210 | ndg | 1.5168 vg | 64.20 |
| R16 | ∞ | d16= | 0.623 | | | |

Table 10 shows aspherical surface data of each lens of the camera optical lens 30 in Embodiment 3 of the present disclosure.

TABLE 10

| | Conic coefficient | Aspheric surface coefficients | | | | | | |
|---|---|---|---|---|---|---|---|---|
| | k | A4 | A6 | A8 | A10 | A12 | A14 | A16 |
| R1 | 0.0000E+00 | −1.9745E−02 | −8.7874E−03 | 5.1439E−04 | −3.0594E−03 | 1.3058E−03 | 1.2674E−04 | −7.7209E−05 |
| R2 | 0.0000E+00 | −4.1555E−02 | −9.1554E−03 | 1.6915E−03 | 1.7709E−03 | 1.1259E−03 | −7.8238E−05 | −4.6283E−05 |
| R3 | 0.0000E+00 | −2.2916E−02 | −8.3735E−04 | 3.2472E−03 | 2.0538E−03 | −4.9491E−04 | 2.3529E−05 | 3.7200E−05 |
| R4 | 0.0000E+00 | −5.0134E−03 | −4.8783E−03 | 9.7107E−04 | −7.6459E−04 | −4.2099E−04 | 3.0973E−04 | −1.3206E−05 |
| R5 | 0.0000E+00 | −1.7867E−02 | −5.8593E−03 | −2.3450E−03 | 6.0960E−03 | −2.0047E−03 | 5.4046E−04 | −1.2313E−04 |
| R6 | 0.0000E+00 | −1.9212E−02 | −1.9078E−02 | 2.9042E−02 | −3.2553E−02 | 2.6651E−02 | −1.0246E−02 | 1.4763E−03 |
| R7 | 0.0000E+00 | −4.7321E−02 | 4.2489E−02 | −6.4822E−02 | 5.1439E−02 | −2.1973E−02 | 6.6615E−03 | −1.2632E−03 |
| R8 | 0.0000E+00 | −1.8600E−01 | 2.2792E−01 | −1.9468E−01 | 1.1329E−01 | −4.1171E−02 | 8.0909E−03 | −6.2741E−04 |
| R9 | 0.0000E+00 | −1.7883E−01 | 2.2025E−01 | −1.5470E−01 | 7.6027E−02 | −2.5396E−02 | 5.0319E−03 | −4.4057E−04 |
| R10 | 0.0000E+00 | −5.4648E−03 | −1.4085E−04 | 1.1817E−02 | −7.9492E−03 | 3.3595E−03 | −7.4218E−04 | 5.9655E−05 |
| R11 | 0.0000E+00 | −8.5154E−02 | 2.1782E−02 | −6.9771E−03 | 3.3306E−03 | −1.0986E−03 | 1.8161E−04 | −1.1410E−05 |
| R12 | 0.0000E+00 | −4.4194E−02 | 1.2519E−02 | −4.8249E−03 | 1.2280E−03 | −1.7493E−04 | 1.2614E−05 | −3.5978E−07 |
| R13 | 0.0000E+00 | −1.9847E−02 | 5.4685E−03 | −2.0247E−03 | 4.4993E−04 | −5.4217E−05 | 3.2997E−06 | −7.9837E−08 |
| R14 | 0.0000E+00 | −4.6368E−02 | 1.3643E−02 | −3.0940E−03 | 4.3673E−04 | −3.6763E−05 | 1.6782E−06 | −3.2156E−08 |

Table 11 and Table 12 show design data inflexion points and arrest points of the respective lenses in the camera optical lens 30 according to Embodiment 3 of the present disclosure.

TABLE 11

| | Number(s) of inflexion points | Inflexion point position 1 | Inflexion point position 2 | Inflexion point position 3 |
|---|---|---|---|---|
| P1R1 | 1 | 1.015 | | |
| P1R2 | 2 | 0.755 | 1.035 | |
| P2R1 | 0 | | | |
| P2R2 | 0 | | | |
| P3R1 | 0 | | | |
| P3R2 | 0 | | | |
| P4R1 | 0 | | | |
| P4R2 | 2 | 0.235 | 1.425 | |
| P5R1 | 3 | 0.285 | 0.755 | 1.535 |
| P5R2 | 2 | 1.145 | 1.715 | |
| P6R1 | 2 | 1.975 | 2.195 | |
| P6R2 | 1 | 0.975 | | |
| P7R1 | 1 | 1.315 | | |
| P7R2 | 2 | 1.025 | 3.705 | |

TABLE 12

| | Number of arrest points | Arrest point position 1 | Arrest point position 2 |
|---|---|---|---|
| P1R1 | 0 | | |
| P1R2 | 0 | | |
| P2R1 | 0 | | |
| P2R2 | 0 | | |
| P3R1 | 0 | | |
| P3R2 | 0 | | |
| P4R1 | 0 | | |
| P4R2 | 1 | 0.435 | |
| P5R1 | 2 | 0.605 | 0.875 |
| P5R2 | 0 | | |
| P6R1 | 0 | | |
| P6R2 | 1 | 1.965 | |
| P7R1 | 1 | 2.685 | |
| P7R2 | 1 | 2.555 | |

Figure 10:
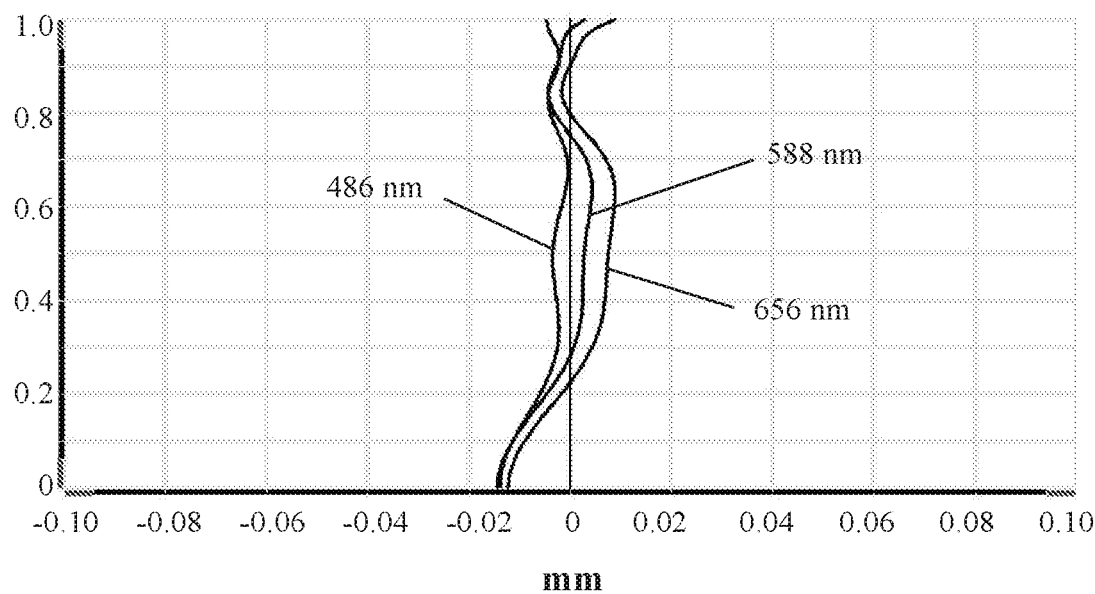
FIG. 10 is a schematic diagram of a longitudinal aberration of the camera optical lens shown in FIG. 9.
Figure 11:
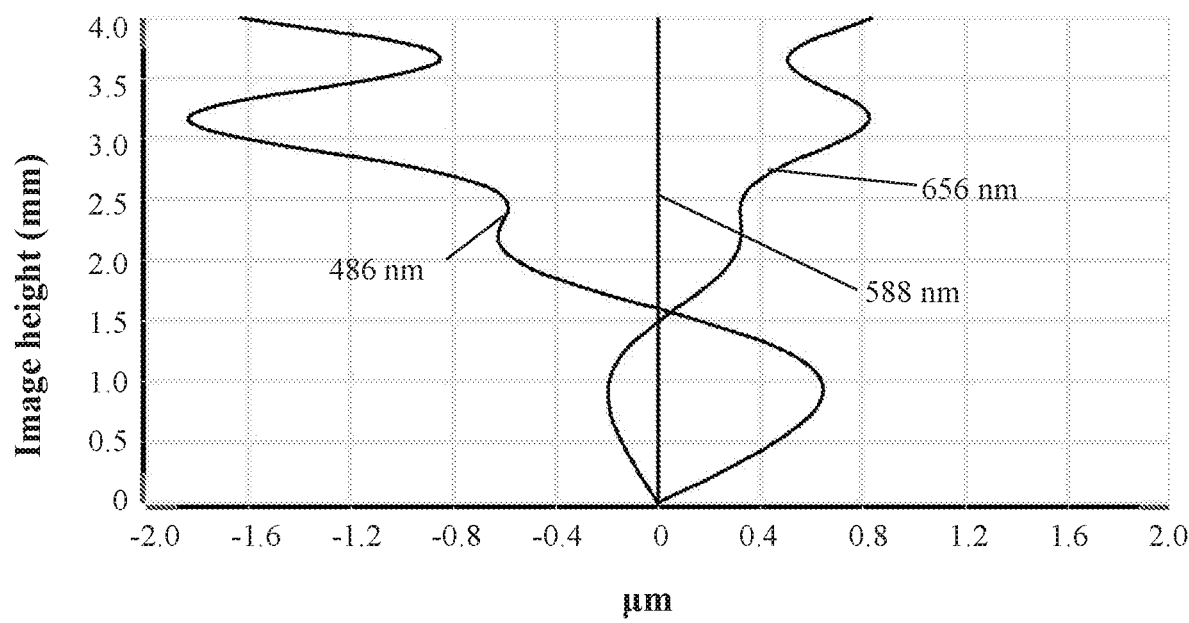
FIG. 11 is a schematic diagram of a lateral color of the camera optical lens shown in FIG. 9.
Figure 12:
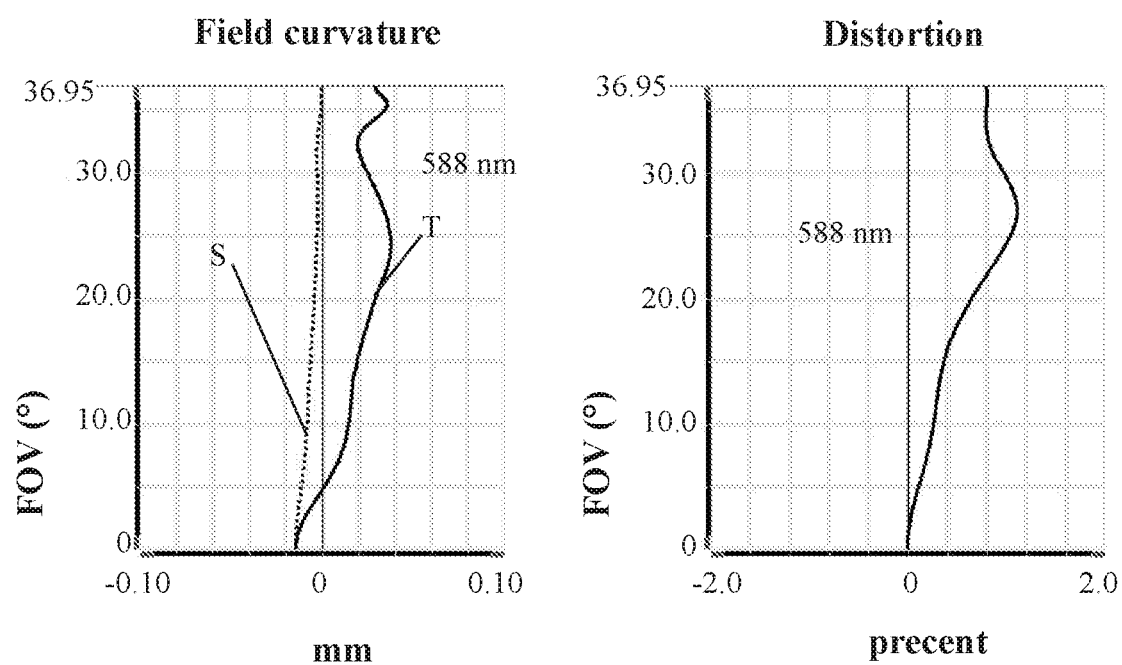
FIG. 12 is a schematic diagram of a field curvature and a distortion of the camera optical lens shown in FIG. 9.

FIG. 10 and FIG. 11 illustrate a longitudinal aberration and a lateral color of light with wavelengths of 486 nm, 588 nm and 656 nm after passing the camera optical lens 30 according to Embodiment 3. FIG. 12 illustrates a field curvature and a distortion of light with a wavelength of 588 nm after passing the camera optical lens 30 according to Embodiment 3.

Table 13 in the following lists values corresponding to the respective conditions in an embodiment according to the above conditions. Obviously, the embodiment satisfies the above conditions.

In an embodiment, an entrance pupil diameter of the camera optical lens is 2.765 mm, an image height of 1.0H is 4.00 mm, a FOV (field of view) in the diagonal direction is 73.89°. Thus, the camera optical lens has a wide-angle and is ultra-thin. Its on-axis and off-axis aberrations are fully corrected, thereby achieving excellent optical characteristics.

TABLE 13

| Parameters and conditions | Embodiment 1 | Embodiment 2 | Embodiment 3 |
|---|---|---|---|
| f | 6.525 | 5.243 | 5.254 |
| f1 | 10.024 | 10.537 | 13.078 |
| f2 | 48.901 | 3.655 | 7.784 |
| f3 | −10.309 | −3.415 | −15.922 |
| f4 | 5.189 | −413.568 | −8.044 |
| f5 | −12.971 | 19.017 | 4.161 |
| f6 | −27.408 | 5.569 | −6.092 |
| f7 | −39.019 | −2.971 | −29.955 |
| f12 | 8.178 | 2.950 | 5.131 |
| FNO | 1.90 | 1.90 | 1.90 |
| f1/f | 1.54 | 2.01 | 2.49 |
| n3 | 1.72 | 1.95 | 2.15 |
| f3/f4 | −1.99 | 8.26E−03 | 1.99 |
| (R13 + R14)/(R13 − R14) | −9.97 | 8.70E−04 | 9.98 |
| n7 | 1.72 | 1.95 | 2.15 |

It can be appreciated by one having ordinary skill in the art that the description above is only embodiments of the present disclosure. In practice, one having ordinary skill in the art can make various modifications to these embodiments in forms and details without departing from the scope of the present disclosure.

What is claimed is:

1. A camera optical lens comprising, from an object side to an image side:
   a first lens having a positive refractive power;
   a second lens having a positive refractive power;
   a third lens having a negative refractive power;
   a fourth lens;
   a fifth lens;
   a sixth lens; and
   a seventh lens having a negative refractive power;
   wherein the camera optical lens satisfies following conditions:

$1.51 \leq f1/f \leq 2.50$, $1.70 \leq n3 \leq 2.20$, $-2.00 \leq f3/f4 \leq 2.00$;

$-10.00 \leq (R13+R14)/(R13-R14) \leq 10.00$; and $1.70 \leq n7 \leq 2.20$;

where
   f denotes a focal length of the camera optical lens;
   f1 denotes a focal length of the first lens;
   f3 denotes a focal length of the third lens;
   f4 denotes a focal length of the fourth lens;
   n3 denotes a refractive index of the third lens;
   n7 denotes a refractive index of the seventh lens;
   R13 denotes a curvature radius of an object-side surface of the seventh lens; and
   R14 denotes a curvature radius of an image-side surface of the seventh lens.

2. The camera optical lens according to claim 1 further satisfying following conditions:

$1.52 \leq f1/f \leq 2.49$;

$1.71 \leq n3 \leq 2.18$;

$-1.99 \leq f3/f4 \leq 1.99$;

$-9.99 \leq (R13+R14)/(R13-R14) \leq 9.99$; and $1.71 \leq n7 \leq 2.18$.

3. The camera optical lens according to claim 1, wherein an object-side surface of the first lens is convex in a paraxial region and an image-side surface of the first lens is concave in the paraxial region; and the camera optical lens further satisfies following conditions:

$-11.83 \leq (R1+R2)/(R1-R2) \leq -2.18$; and $0.03 \leq d1/TTL \leq 0.11$;

where

R1 denotes a curvature radius of the object-side surface of the first lens;

R2 denotes a curvature radius of the image-side surface of the first lens;

d1 denotes an on-axis thickness of the first lens; and

TTL denotes a total optical length from the object-side surface of the first lens to an image surface of the camera optical lens along an optical axis.

4. The camera optical lens according to claim 3 further satisfying following conditions:

$-7.39 \leq (R1+R2)/(R1-R2) \leq -2.73$; and $0.04 \leq d1/TTL \leq 0.09$.

5. The camera optical lens according to claim 1, wherein an object-side surface of the second lens is convex in a paraxial region, and the camera optical lens further satisfies following conditions:

$0.35 \leq f2/f \leq 11.24$;

$-40.21 \leq (R3+R4)/(R3-R4) \leq -0.06$; and $0.03 \leq d3/TTL \leq 0.16$;

where f2 denotes a focal length of the second lens;

R3 denotes a curvature radius of the object-side surface of the second lens;

R4 denotes a curvature radius of an image-side surface of the second lens;

d3 denotes an on-axis thickness of the second lens; and

TTL denotes a total optical length from an object-side surface of the first lens to an image surface of the camera optical lens along an optical axis.

6. The camera optical lens according to claim 5 further satisfying following conditions:

$0.56 \leq f2/f \leq 8.99$;

$-25.13 \leq (R3+R4)/(R3-R4) \leq -0.08$; and $0.04 \leq d3/TTL \leq 0.13$.

7. The camera optical lens according to claim 1, wherein an image-side surface of the third lens is concave in a paraxial region, and the camera optical lens further satisfies following conditions:

$-6.06 \leq f3/f \leq -0.43$;

$-0.18 \leq (R5+R6)/(R5-R6) \leq 13.44$; and $0.01 \leq d5/TTL \leq 0.08$;

where

R5 denotes a curvature radius of an object-side surface of the third lens;

R6 denotes a curvature radius of the image-side surface of the third lens;

d5 denotes an on-axis thickness of the third lens; and

TTL denotes a total optical length from an object-side surface of the first lens to an image surface of the camera optical lens along an optical axis.

8. The camera optical lens according to claim 7 further satisfying following conditions:

$-3.79 \leq f3/f \leq -0.54$;

$-0.11 \leq (R5+R6)/(R5-R6) \leq 10.75$; and $0.02 \leq d5/TTL \leq 0.06$.

9. The camera optical lens according to claim 1, wherein the fourth lens has a refractive power, and the camera optical lens further satisfies following conditions:

$-157.76 \leq f4/f \leq 1.19$;

$-1.86 \leq (R7+R8)/(R7-R8) \leq 47.99$; and $0.03 \leq d7/TTL \leq 0.23$;

where

R7 denotes a curvature radius of an object-side surface of the fourth lens;

R8 denotes a curvature radius of an image-side surface of the fourth lens;

d7 denotes an on-axis thickness of the fourth lens; and

TTL denotes a total optical length from an object-side surface of the first lens to an image surface of the camera optical lens along an optical axis.

10. The camera optical lens according to claim 9 further satisfying following conditions:

$-98.60 \leq f4/f \leq 0.95$;

$-1.16 \leq (R7+R8)/(R7-R8) \leq 38.40$; and $0.04 \leq d7/TTL \leq 0.18$.

11. The camera optical lens according to claim 1, wherein the fifth lens has a refractive power, an image-side surface of the fifth lens is convex in a paraxial region, and the camera optical lens further satisfies following conditions:

the camera optical lens further satisfies following conditions:

$-3.98 \leq f5/f \leq 5.44$;

$-3.31 \leq (R9+R10)/(R9-R10) \leq 1.28$; and $0.06 \leq d9/TTL \leq 0.24$;

where f5 denotes a focal length of the fifth lens;

R9 denotes a curvature radius of an object-side surface of the fifth lens;

R10 denotes a curvature radius of the image-side surface of the fifth lens;

d9 denotes an on-axis thickness of the fifth lens; and

TTL denotes a total optical length from an object-side surface of the first lens to an image surface of the camera optical lens along an optical axis.

12. The camera optical lens according to claim 11 further satisfying following conditions:

$-2.48 \leq f5/f \leq 4.35$;

$-2.07 \leq (R9+R10)/(R9-R10) \leq 1.02$; and $0.10 \leq d9/TTL \leq 0.19$.

13. The camera optical lens according to claim 1, wherein the sixth lens has a refractive power, an image-side surface of the sixth lens is concave in a paraxial region, and the camera optical lens further satisfies following conditions:
the camera optical lens further satisfies following conditions:

$-8.40 \leq f6/f \leq 1.59$;

$-5.91 \leq (R11+R12)/(R11-R12) \leq 7.63$; and $0.04 \leq d11/TTL \leq 0.27$;

where
f6 denotes a focal length of the sixth lens;
R11 denotes a curvature radius of an object-side surface of the sixth lens;
R12 denotes a curvature radius of the image-side surface of the sixth lens;
d11 denotes an on-axis thickness of the sixth lens; and
TTL denotes a total optical length from an object-side surface of the first lens to an image surface of the camera optical lens along an optical axis.

14. The camera optical lens according to claim 13 further satisfying following conditions:

$-5.25 \leq f6/f \leq 1.27$;

$-3.69 \leq (R11+R12)/(R11-R12) \leq 6.10$; and $0.06 \leq d11/TTL \leq 0.22$.

15. The camera optical lens according to claim 1, wherein the seventh lens has a negative refractive power, and
the camera optical lens further satisfies following conditions:

$-11.96 \leq f7/f \leq -0.38$; and $0.02 \leq d13/TTL \leq 0.14$;

where
f7 denotes a focal length of the seventh lens;
d13 denotes an on-axis thickness of the seventh lens; and
TTL denotes a total optical length from an object-side surface of the first lens to an image surface of the camera optical lens along an optical axis.

16. The camera optical lens according to claim 15 further satisfying following condition:

$-7.47 \leq f7/f \leq -0.47$; and $0.04 \leq d13/TTL \leq 0.11$.

17. The camera optical lens according to claim 1, where a total optical length TTL from an object-side surface of the first lens to an image surface of the camera optical lens along an optical axis is less than or equal to 8.62 mm.

18. The camera optical lens according to claim 17, wherein the total optical length TTL of the camera optical lens is less than or equal to 8.23 mm.

19. The camera optical lens according to claim 1, wherein an F number of the camera optical lens is less than or equal to 1.96.

20. The camera optical lens according to claim 19, wherein the F number of the camera optical lens is less than or equal to 1.92.

* * * * *